Patented Oct. 19, 1954

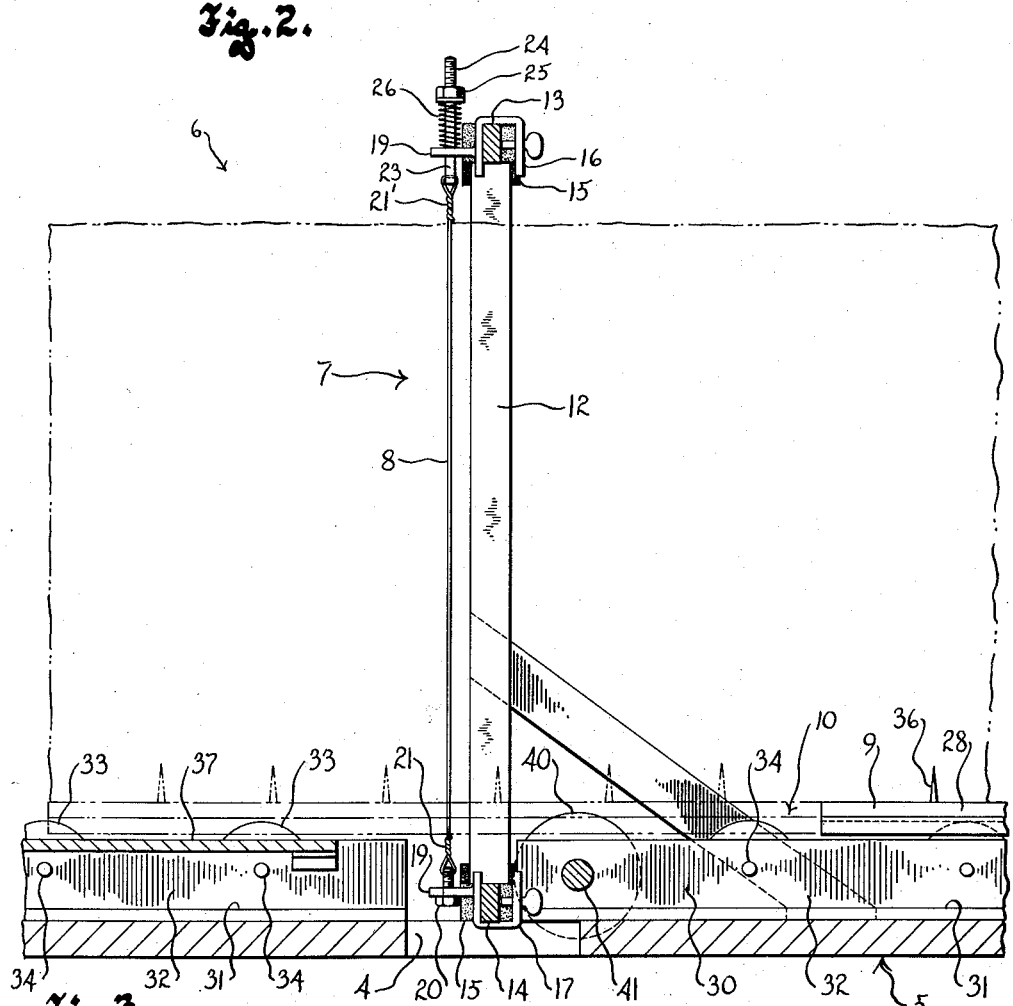
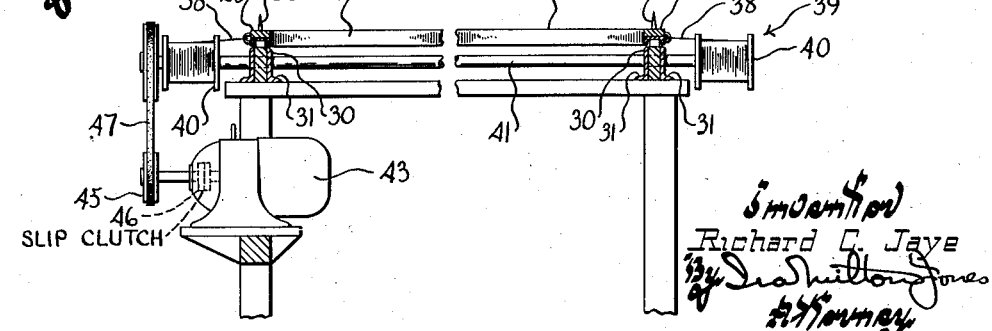

2,692,328

UNITED STATES PATENT OFFICE 2,692,328

APPARATUS FOR CUTTING STYROFOAM LOGS INTO BARS OR RAILS

Richard C. Jaye, Watertown, Wis.

Application April 29, 1953, Serial No. 351,795

2 Claims. (Cl. 219—19)

This invention relates generally to apparatus for cutting cellular plastic material of the type sold under the trade name "Styrofoam," and is more particularly concerned with apparatus for cutting large blocks or logs of such material into smaller straight-sided bars or slabs.

Cellular plastic material in the nature of styrene foam is produced in relatively large blocks or logs which are somewhat difficult to work with because of their size. In order to use this material advantageously, and particularly in order to use it in the apparatus described in my copending companion application, Serial No. 337,967, filed February 20, 1953, it is necessary to cut these blocks or logs into relatively small slabs or bars which have straight, parallel sides along the entire length thereof.

The present invention has for its object the provision of simple and inexpensive apparatus whereby such blocks or logs of styrene foam and similar material can be cut into smaller slabs having straight, parallel sides and having any desired dimension smaller than that of the log from which they are cut.

Another object of this invention resides in the provision of apparatus for cutting blocks of styrene foams and the like into slabs of the character described, in which apparatus a log of styrene foam may be mounted on a carriage to be thereby conveyed past laterally spaced hot wire cutting elements, the carriage being constrained to motion in a straight line so as to assure that the cuts made by the hot wires will be perfectly straight and will therefore produce a slab having a pair of opposite sides which are straight and parallel.

Still another object of this invention resides in the provision of apparatus of the character described having a carriage upon which logs of styrene foam of various sizes and shapes may be very readily secured in place without the necessity for adjusting any clamp or other securement means and without the necessity for performing any adjustment on the carriage to accommodate it to variations in the size and shape of the logs.

A further object of this invention resides in the provision of apparatus for cutting cellular thermoplastic material by means of a hot wire resistance element wherein the resistance element will always be maintained under substantial tension and wherein the pressure of the thermoplastic material against the wire is always uniform so as to assure a straight uniform cut regardless of the temperature of the hot wire resistance element.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

Figure 2 is a longitudinal sectional view of a portion of the Figure 1 apparatus; and Figure 3 is a cross-sectional view of a modified embodiment of the apparatus of this invention.

Figure 1:
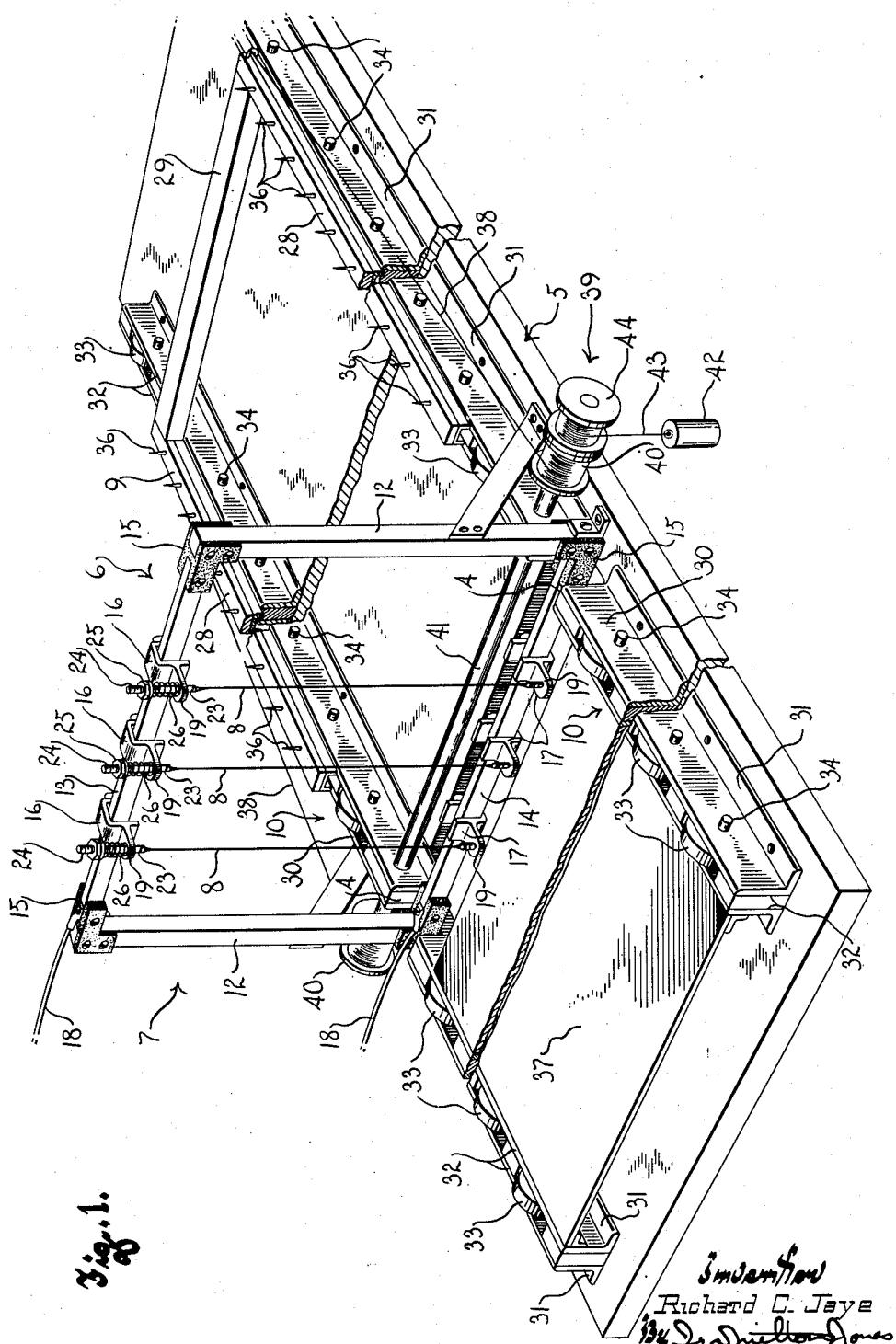
Figure 1 is a perspective view of an apparatus, embodying the principles of this invention, for cutting logs of cellular thermoplastic material.

Referring now more particularly to the accompanying drawings, the numeral 5 designates generally a bed or base upon which the apparatus, designated generally by 6, is mounted and which may comprise a bench or table top or any other suitable support having a substantially flat surface. The apparatus itself comprises a cutting station designated generally by 7, having a number of resistance wire cutting elements 8 stretched thereacross, and a carriage 9 which is constrained to linear back and forth motion through the cutting station by guide means designated generally by 10, and upon which carriage a block or log of material to be cut may be mounted to be sliced into slabs by the cutting elements as the block or log is moved through the cutting station by the carriage.

The cutting station 7 comprises an upright rectangular frame having conductive side members, including a pair of vertical posts 12 secured to the base at opposite sides thereof and a pair of horizontal members 13 and 14 which are rigidly secured to the posts at the tops and bottoms thereof, respectively, by means of insulated angles 15. Both the posts and the horizontal members are preferably made of metal, but by reason of the fact that the angles are of insulative material each of the frame members is insulated from the others.

Each of the resistance wires 8 is fastened to a pair of anchors, one of which 16, at the upper end of the wire, is secured to the upper frame member, while the other 17, at the lower end of the wire, is secured to the lower frame member, so that the cutting element spans the space between the upper and lower frame members. To enable current to flow to the cutting elements to heat them by electrical resistance, conductors 18 are connected with the horizontal members and are connectable with a source of current (not shown), and the wire anchors are made of metal so as to electrically connect the wires with the frame members. The horizontal frame members thus not only provide bearers for supporting the resistance wire cutting elements but also comprise buses by which current is conducted to them.

It will be obvious that with the cutting elements disposed as shown they will make a series of vertical cuts in a block or log drawn through them; but if it is desired to make a series of horizontal cuts in a "Styrofoam" block as it is moved through the cutting station, the cutting elements may be carried by the upright posts 12, to dispose them horizontally, the conductors 18 being of course connected with the posts in that case.

The wire anchors 16 and 17 comprise C-clamps which are readily adjustable lengthwise along the transverse members 13 and 14, respectively, to which they are secured. It will be observed that the frame members are rectangular in cross section to prevent the brackets from rotating around them. An ear 19 extends laterally from the C-clamp portion of each wire anchor and carries a terminal to which the resistance element is secured. In the case of the lower wire anchor 17 the terminal may comprise a bolt 20 projecting through a hole in the ear with its head lowermost and having a hole diametrically through its shank through which the resistance wire is passed, the wire being twisted upon itself as at 21 to secure it to the terminal.

To compensate for the lengthwise expansion and contraction of the cutting element with changes in its temperature, each resistance wire is at all times maintained under tension by means of a spring-loaded tension rod 23 to which its upper end is connected and which comprises the terminal on the upper wire anchor. The tension rod is endwise slidable vertically in a hole in the ear of the upper wire anchor 16 and the resistance wire extends through a hole diametrically through the lower portion of the tension rod, the end portion of the wire being twisted upon itself as at 21' to secure it to the terminal. The upper end portion of the rod is threaded, as at 24, to receive a tension nut 25; and a compression spring 26, surrounding the rod and reacting between the ear and the tension nut, biases the rod upwardly to keep the resistance wire under tension at all times, the biasing force of the spring being adjustable by means of the tension nut.

The carriage 9 upon which blocks or logs are mounted to be carried through the cutting station comprises a pair of channel-like sills 28 rigidly connected at their rear ends by means of a cross bar 29 which holds them parallel and spaced from one another a distance less than the distance between the posts 12.

The carriage is constrained to back and forth horizontal motion through the cutting station by means of a pair of roller tracks 30 upon which the sills are endwise slidably carried and which are disposed transversely to the plane of the cutting station frame. The roller tracks are interrupted in the neighborhood of the cutting station, as at 4, so as to provide space for the lower transverse frame member, the end portions of which project laterally beyond the rails.

Each of the roller tracks consists of a pair of angle iron rails having their flanges 31 flatwise secured to the bed and extending in opposite directions and their webs 32 spaced from and parallel to one another. Rollers 33 are freely rotatably journaled on shafts 34 mounted in the rails, and the rollers project above the webs of the angle irons in which they are mounted, their tops being tangent to a straight line parallel to the bed.

The downwardly projecting flanges of each channel-shaped sill are spaced apart a distance substantially equal to the width of the rollers 33, and their depth is less than the distance the rollers project above the rails 32, so that the sills can ride upon and be guided for linear motion by the rollers. It will be understood that the spacing between roller centers is considerably less than the length of the sills so that each sill is at all times carried by at least two rollers.

Because the roller tracks are disposed laterally inwardly of the posts 12 of the cutting station, the carriage is able to pass between these posts and thus carry a block or log of styrene foam entirely through the cutting station. The log is secured to the carriage by sharp-pointed spikes 36 extending upwardly from each of the sills at spaced intervals therealong and upon which the block or log to be cut is impaled, to be thus securely held in place during the cutting operation. This method of securement eliminates any need for clamps and the like and also permits the carriage to carry logs of any size equal to or greater than the width of the carriage without necessitating any adjustment of the carriage itself to accommodate them.

Preferably the styrene foam block or log is impaled on the carriage with its rear surface spaced slightly forwardly of the cross bar 29 so that the entire block or log may be moved past the cutting elements without having the cross bar encounter the cutting elements. In front of the cutting station a table 37 spans the space between roller tracks, on a level with the upper edges of the webs 32, to which it may be secured, and this table receives the cut slabs of "Styrofoam" emerging from the cutting station.

The carriage is moved forwardly, to propel the block or log thereon through the cutting station, by means of cables 38 secured to the rear of the carriage at opposite sides thereof and connected with a windlass 39 near the cutting station. The windlass comprises a pair of drums 40, one at each side of the roller tracks, fixed to opposite end portions of a shaft 41 which is rotatably journaled in the webs of the rollers tracks. The shaft, and thus the windlass drums, is rotated by a weight 42 pulling on a cable 43 wound upon a pulley 44 also fixed to the shaft. In this manner the block or log of "Styrofoam" is pressed against the hot wire cutting elements with a uniform pressure so as to produce a uniform thickness cut regardless of variations in temperature of the wires. The same uniform feeding pressure can be developed by the arrangement shown in Figure 3 wherein an electric motor 45 drives the shaft 41 through a gear reduction (not shown), a uniform tension slip clutch 46 and a belt drive 47. Obviously, the tension of the slip clutch should be adjustable.

From the foregoing description taken together with the accompanying drawings it will be readily apparent that this invention provides a simple and inexpensive apparatus for cutting blocks or logs of cellular plastic material into smaller slabs or bars which have straight parallel sides along their entire length, and which apparatus has a very simple carriage upon which the logs may be readily secured to be carried through a cutting station where they are cut by hot resistance wire cutting elements.

What I claim as my invention is:

1. Apparatus for cutting logs of cellular thermoplastic material into smaller straight-sided slabs, comprising: a pair of parallel tracks, each of said tracks comprising a plurality of rollers and means freely rotatably mounting the rollers in a row with their axes crosswise of the tracks; a pair of channel-shaped sills, each mounted on one of said tracks for endwise movement therealong, with its web portion riding on said rollers and its flanges in guiding engagement with the sides of said rollers; a cross bar rigidly connecting the sills at one end thereof to constrain the sills to move in unison along said tracks; a plurality of upwardly projecting spikes on each of said sills upon which a log of cellular thermoplastic material may be impaled to be carried by said sills along said tracks; a substantially rectangular upright frame having electrically conductive upright and horizontal side members insulated from one another, said frame being mounted perpendicular to said tracks and intermediate the ends thereof, with its opposite side members on opposite sides of the tracks so that said sills may pass through the frame in moving along the tracks; conductor means for connecting a pair of opposite side members of said frame with a source of current; a plurality of resistance wire cutting elements; and a plurality of conductive anchors lengthwise adjustably secured to each of said pair of side members and to which the ends of said cutting elements are secured to dispose the cutting elements across the path of a log of material carried by said sills and electrically connecting the cutting elements with said side members to enable the cutting elements to be heated by electrical resistance in consequence of connection of said conductor means with a source of current, so that each of said cutting elements will make a straight cut in a block of material moved past the same on said carriage.

2. The apparatus of claim 1, further characterized by means for propelling said sills along said tracks in the direction of the rectangular frame at a rate such that a log of cellular plastic material impaled upon the sills will be pressed against said resistance wire cutting elements with a substantially uniform pressure as it is moved past the same.

References Cited in the file of this patent

UNITED STATES PATENTS

| Number | Name | Date |
| --- | --- | --- |
| 2,083,848 | La Berge | June 15, 1937 |
| 2,226,413 | Schwimmer | Dec. 24, 1940 |
| 2,282,546 | Schwimmer | May 12, 1942 |
| 2,300,699 | Perry | Nov. 3, 1942 |
| 2,651,702 | Burke et al. | Sept. 8, 1953 |